United States Patent
Van Den Dungen

[19]

[11] Patent Number: 6,163,432
[45] Date of Patent: Dec. 19, 2000

[54] METHOD OF ADJUSTING THE POSITION OF A PRERECORDED MAGNETIC TAPE DURING MANUFACTURING, AND THE MAGNETIC-TAPE APPARATUS SUITABLE FOR CARRYING OUT THE METHOD

[75] Inventor: Michiel G. Van Den Dungen, Baarn, Netherlands

[73] Assignee: U.S. Philips Corporation, New York, N.Y.

[21] Appl. No.: 08/425,306

[22] Filed: Apr. 17, 1995

Related U.S. Application Data

[63] Continuation of application No. 08/233,543, Apr. 26, 1994, which is a continuation of application No. 07/929,064, Aug. 12, 1992, abandoned.

[30] Foreign Application Priority Data

Aug. 13, 1991 [EP] European Pat. Off. .............. 91202067

[51] Int. Cl.[7] .......................... G11B 5/008; B65H 23/038
[52] U.S. Cl. ................................ 360/93; 226/21
[58] Field of Search .............................. 360/90, 93, 96.1, 360/96.2, 96.3, 96.4, 130.21; 226/3, 18, 19, 190, 196, 199, 15, 20.21

[56] References Cited

U.S. PATENT DOCUMENTS

| | | | |
|---|---|---|---|
| 4,212,422 | 7/1980 | Rauchfuss, Jr. et al. | 226/196 |
| 4,336,900 | 6/1982 | Pontoni | 226/199 |
| 4,582,235 | 4/1986 | Schulz | 226/20 |
| 4,873,592 | 10/1989 | Dulaff et al. | 360/90 |
| 4,913,328 | 4/1990 | Schulz | 226/21 |
| 5,069,027 | 12/1991 | Stahlecker et al. | 57/264 |
| 5,206,771 | 4/1993 | Katou et al. | 226/15 |

FOREIGN PATENT DOCUMENTS

| | | | |
|---|---|---|---|
| 0022260 | 2/1984 | Japan | 360/130.21 |
| 0259253 | 11/1987 | Japan | 360/130.21 |
| 2285270 | 12/1987 | Japan | 360/130.21 |
| 0622161 | 8/1978 | U.S.S.R. | 360/130.21 |

OTHER PUBLICATIONS

Philips Technical Review, vol. 31, 1970, No. 3.

*Primary Examiner*—Brian E. Miller

[57] ABSTRACT

In a magnetic-tape apparatus (1) a magnetic tape (2) is conveyed from a supply reel (35) to a take-up reel (39) via a first height guide (25), a first capstan and pressure roller combination (17), a magnetic-head unit (5), a second capstan and pressure roller combination (19), and a second height guide (29). In a method of manufacturing prerecorded magnetic tape (2), before the information is recorded on the magnetic tape and while the magnetic tape is guided by the height guides (25, 29), first the first height guide (25) is adjusted in a direction parallel to the width direction (71) of the magnetic tape during tape transport, the first pressure roller (103) being kept clear of the first capstan (55). Subsequently, the second height guide (29) is adjusted during tape transport, the second pressure roller (105) being kept clear of the second capstan (57). The positional change of the magnetic tape (2) at the location of the magnetic-head unit (5) is fed back during the adjustment until the magnetic tape (2) has reached such a position relative to the magnetic-head unit (5) that during recording the information is recorded in tracks (115) within a specified tolerance at the specified position on the magnetic tape (2). After this, the information is recorded on the magnetic tape.

7 Claims, 3 Drawing Sheets

METHOD OF ADJUSTING THE POSITION OF A PRERECORDED MAGNETIC TAPE DURING MANUFACTURING, AND THE MAGNETIC-TAPE APPARATUS SUITABLE FOR CARRYING OUT THE METHOD

This is a continuation of application Ser. No. 08/233,543, filed Apr. 26, 1994 and which is a continuation of application Ser. No. 07/929,064, filed Aug. 12, 1992, now abandoned.

BACKGROUND OF THE INVENTION

The invention relates to a method of manufacturing a prerecorded magnetic tape, the method comprising the recording of information in longitudinal tracks within a specified tolerance at a specified position on a magnetic tape, the magnetic tape being conveyed from a supply reel to a take-up reel via a first height guide, a first capstan and pressure roller combination, a magnetic-head unit for recording information on the magnetic tape, a second capstan and pressure roller combination, and a second height guide, edges of the magnetic tape being clear of parts of a magnetic-tape apparatus in a tape-path section between the capstans, and the height guides being adjusted in a direction parallel to the width direction of the magnetic tape before the information is recorded on the magnetic tape.

Methods of the kind defined in the opening paragraph are used inter alia when magnetic tape is prerecorded in duplication apparatuses. Such a method is known inter alia from the manufacture of prerecorded magnetic tape for Compact Cassettes. For this purpose the magnetic tape is moved past the magnetic-head unit at high speed, the magnetic-head unit recording 4 tracks having a width of 620 $\mu$m each and an intertrack spacing of 300 $\mu$m onto the magnetic tape. A magnetic-tape apparatus by means of which the known method can be carried out is disclosed in Philips Technical Review, Volume 31, 1970, no. 3. In said apparatus and in other sophisticated apparatuses the transport of the magnetic tape is effected by means of a capstan on either side of the magnetic-head unit, the magnetic tape being pressed against the capstans by pressure rollers. This results in an accurate lace-up at the location of the magnetic-head unit. With the known method the height guides are adjusted in a direction parallel to the width direction of the magnetic tape by arranging spacers of accurately defined thickness between the mounting surface of the magnetic-tape apparatus and the height guides and by fixing the height guides at the resulting distance from the mounting surface. However, it has been found that during tape transport the position of the magnetic tape deviates slightly from the position of the magnetic tape in the static condition. These slight differences in the position of the magnetic tape in the static condition and the magnetic tape in the dynamic condition are undesirable when tracks are to be recorded on a magnetic tape with a very high positional accuracy. In the case of novel magnetic-tape apparatuses for manufacturing prerecorded magnetic tape for new digital cassettes, (see U.S. patent application Ser. No. 795,280, filed Nov. 19, 1991, Attorney's Docket No. PHN 12,816B) herewith incorporated by reference) the tape path should be adjusted more accurately because the magnetic-head unit then records 18 tracks having a width of only 185 $\mu$m and an inter-track spacing of 10 $\mu$m on the magnetic tape.

OBJECTS AND SUMMARY OF THE INVENTION

It is an object of the invention to provide a method of the type defined in the opening paragraph, by means of which the desired position of the tracks to be to written on the magnetic tape can be realized accurately. To this end the method in accordance with the invention is characterised in that before the information is recorded on the magnetic tape and while the magnetic tape is guided by the height guides first the first height guide is adjusted in a direction parallel to a width direction of the magnetic tape during tape transport, the first pressure roller being kept clear of the first capstan, after which the second height guide is adjusted in a direction parallel to a width direction of the magnetic tape during tape transport, the second pressure roller being kept clear of the second capstan and the positional change of the magnetic tape at the location of the magnetic-head unit being fed back during the adjustment until the magnetic tape has reached such a position relative to the magnetic-head unit that during recording the information is recorded in tracks within the specified tolerance at the specified position on the magnetic tape, after which the information is recorded on the magnetic tape. During adjustment it is thus possible to detect changes in position of the magnetic tape relative to the magnetic-head unit during tape transport and to correct the adjustment in response thereto until the magnetic tape occupies the correct position relative to the magnetic-head unit. The correct position is to be understood to mean that position of the magnetic tape relative to the magnetic-head unit for which the position of the tracks written on the magnetic tape corresponds to the position in compliance with a standard. The magnetic tape can be observed visually and feedback can be effected manually. This adjustment method requires that between the capstans the edges of the magnetic tape are not in contact with any parts of the magnetic-tape apparatus because otherwise these parts will disturb the lace-up and thus affect the adjustment of the height guides. By adjusting the magnetic tape in the width direction during tape transport a very high positional accuracy of the magnetic tape is obtained. By keeping the pressure roller situated between the height guide to be adjusted and the magnetic-head unit clear of the capstan the effect of a change in position of the height guide in the width direction of the magnetic tape directly manifests itself at the location of the magnetic-head unit. If the pressure roller presses the magnetic tape against the capstan the effect of a change in the position of the height guide in the width direction of the magnetic tape will not be transmitted fully and directly to the magnetic-head unit because the magnetic tape cannot freely move over the capstan in the width direction.

An embodiment of the method in accordance with the invention is characterised in that between the first height guide and the first capstan and pressure roller combination the magnetic tape is adjusted in a direction parallel to the width direction of the magnetic tape by a third height guide, the first pressure roller being kept clear of the first capstan and adjustment being effected while the magnetic tape is being guided by the third height guide and after the first height guide has been adjusted. This provides a fine adjustment, enabling the magnetic tape to be adjusted even more accurately.

The invention also relates to a magnetic-tape apparatus suitable for carrying out the method in accordance with the invention, which apparatus comprises two reel-drive spindles, two height guides, two capstan and pressure roller combinations and one magnetic-head unit. In the known magnetic-tape apparatus the height guides are not adjustable during tape transport, so that the method in accordance with the invention cannot be used. The apparatus in accordance with the invention is characterised in that the height guides comprise displacement means by which the height guides are adjustable in a direction parallel to the width direction of the magnetic tape during transport of the magnetic tape.

An embodiment of the magnetic-tape apparatus in accordance with the invention is characterised in that a third height guide is arranged between the first height guide and the first capstan and pressure roller combination, which third height guide comprises further displacement means by which the third height guide is adjustable in a direction parallel to the width direction of the magnetic tape during transport of the magnetic tape. This third height guide needs to be moved over a smaller distance than the first height guide because the magnetic tape has already been adjusted fairly accurately by the first height guide. This provides an accurate fine adjustment of the magnetic tape because displacement means enabling displacements in a small range only are generally more accurate than displacement means enabling displacements over a large range.

A further embodiment of the magnetic-tape apparatus in accordance with the invention is characterised in that the magnetic-tape apparatus comprises an optical device by means of which the position of the magnetic tape at the location of the magnetic-head unit can be monitored. Thus, the position of the magnetic tape in the width direction at the location of the magnetic-head unit can be determined accurately, which is desirable for an accurate adjustment of the magnetic tape.

BRIEF DESCRIPTION OF THE DRAWINGS

The invention will now be described in more detail, by way of example, with reference to the drawings. In the drawings.

DESCRIPTION OF THE PREFERRED EMBODIMENTS

Figure 1:
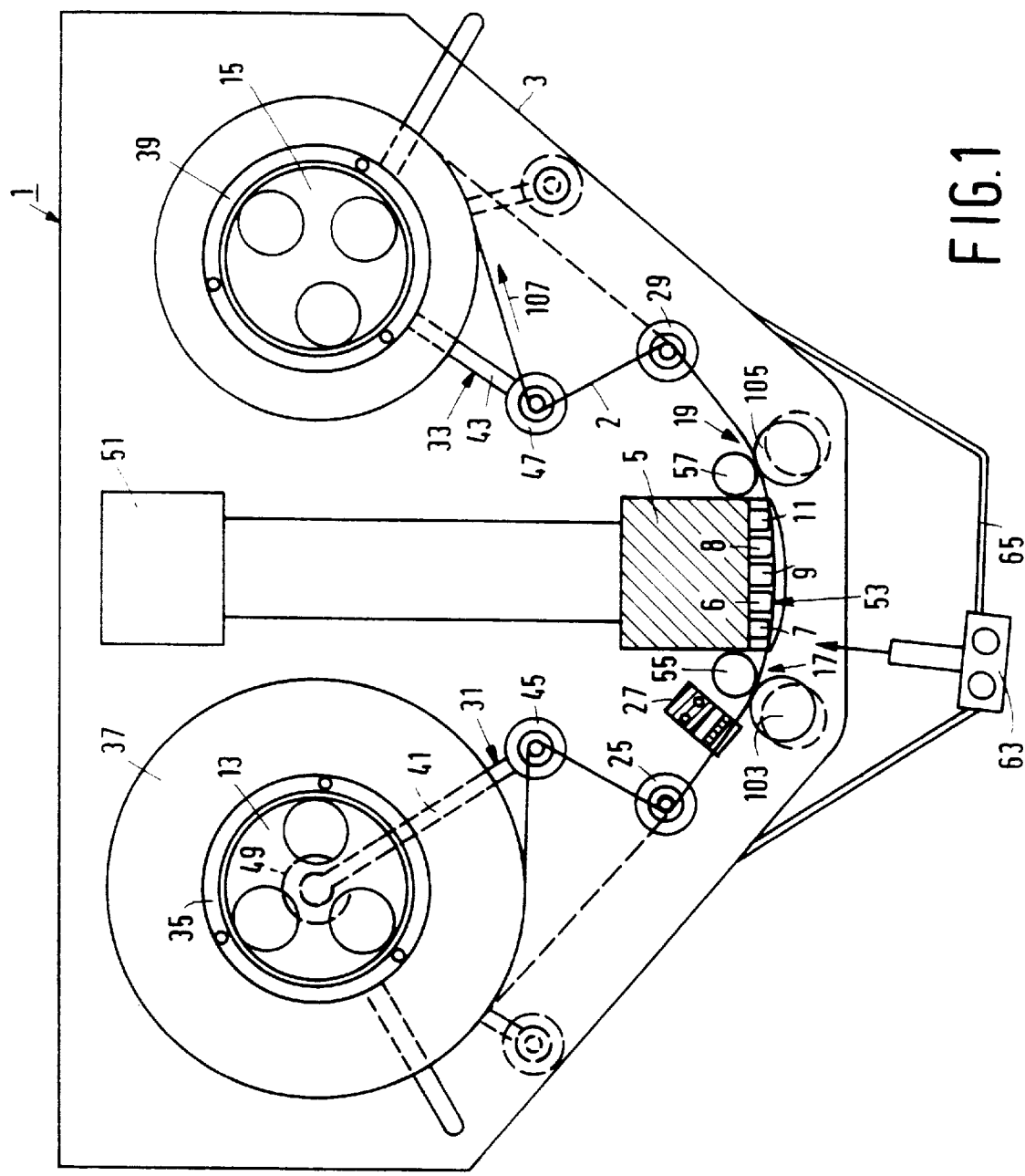
FIG. 1 is a plan view of a magnetic-tape apparatus in accordance with the invention.

FIG. 1 is a plan view of a magnetic-tape apparatus 1 for recording information on a magnetic tape 2. This magnetic-tape apparatus is used in making prerecorded magnetic tape for audio cassettes. The magnetic-tape apparatus 1 has a mounting plate 3 carrying a magnetic-head unit 5 with two magnetic heads 6, 8, two reel-drive spindles 13, 15, two capstan and pressure roller combinations 17, 19, three adjustable height guides 25, 27, 29, and two tape-tension control mechanisms 31, 33. In the initial situation a supply reel 35 with a magnetic-tape spool 37 is mounted on the reel-drive spindle 13. The tape-tension control mechanisms 31, 33 each comprise an arm 41, 43 carrying a tape-guide roller 45, 47 on one of its ends. The other end of the arm is pivotally connected to the mounting plate 3. A spiral spring 49 has one end secured to the arm and another end to the mounting plate to press the tape-guide roller 45 against the magnetic tape 2 with a substantially constant force. The magnetic tape is moved past the tape guide rollers 45, 47, the height guides 25, 27, 29 and the magnetic-head unit 5 by means of two capstan and pressure roller combinations 17, 19 and wound onto a take-up reel 39. During the recording of information on the magnetic tape 2 by the two magnetic heads 6, 8, each magnetic head writing a part of the information, the magnetic tape 2 is moved past the magnetic heads at high speed. The information is applied to the magnetic heads from a memory 51 or from a further magnetic head which reads the information from a master tape (not shown). In a tape-path section 53 between the capstans 55, 57 the edges 59, 61 of the magnetic tape 2 are not in contact with any parts of the magnetic-tape apparatus (see FIG. 2). This is necessary because otherwise these parts will disturb the lace-up and affect the adjustment of the height guides. The magnetic-tape apparatus 1 further comprises an optical device 63, which is movable along a guide 65 and which enables the position of the magnetic tape 2 at the location of the magnetic heads 6, 8 to be monitored.

Figure 2:
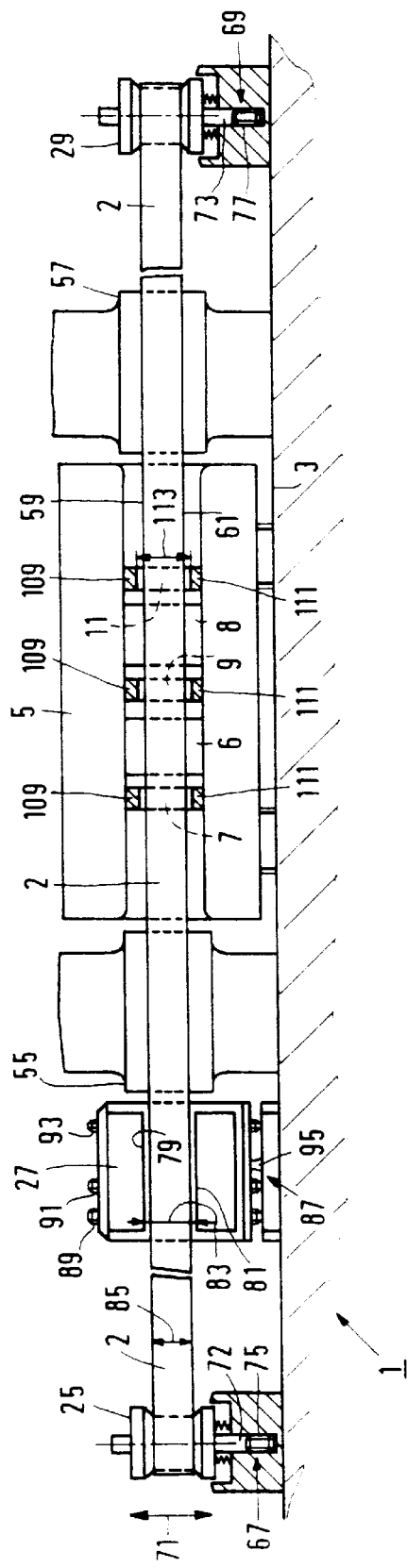
FIG. 2 is a front view of the magnetic-tape apparatus shown in FIG. 1.
Figure 3:
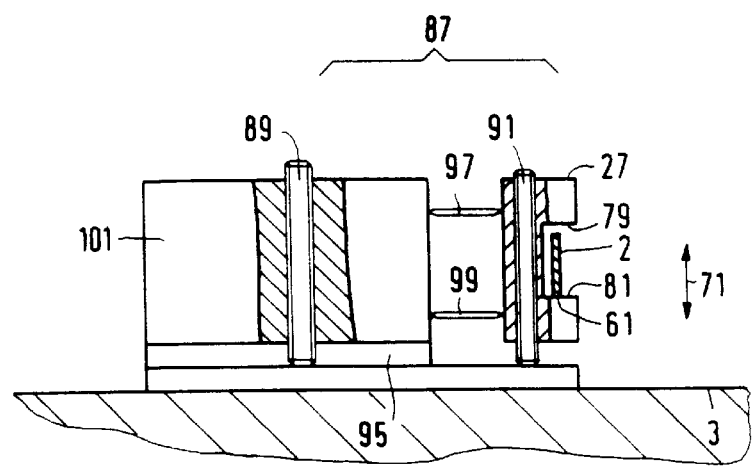
FIG. 3 shows a height guide for fine adjustment of the position of a magnetic tape in the magnetic-tape apparatus.

FIG. 2 is a front view of the magnetic-tape apparatus 1. The first and second height guides 25, 29 have been provided with displacement means 67, 69 for adjusting the height guides 25, 29 in a direction parallel to a width direction 71 of the magnetic tape. These displacement means 67, 69 comprise a spindle 72, 73 which at one end has very fine screwthread 75, 77. Height guides 25 and 29 each comprise a central cylindrical portion 120, 121, top and bottom cylindrical portions 122, 123 and 126, 127, having a larger diameter than the central portion, and two tapered portions 124, 125 and 128, 129 between the central portion and the top and bottom portions, respectively. During tape transport, as they guide the magnetic tape 2, the height guides 25, 29 can be turned. This changes the height of the height guides 25, 29 relative to the mounting surface 3 and enables the magnetic tape 2 to be adjusted in the width direction 71. The third height guide 27 has two tape-edge guide surfaces 79, 81 spaced by a distance 83 larger than the width 85 of the magnetic tape 2. This third height guide 27 comprises further displacement means 87 formed by setscrews 89, 91, 93, a flexible hinge 95 and two parallel arms 97, 99 (see FIG. 3). The third height guide 27 is pivotable about the flexible hinge 95 by means of the setscrews 89 and 93 to adjust the tape-guide surfaces 79, 81 parallel to the magnetic tape 2. Moreover, this third height guide 27 is adjustable in a direction parallel to the width direction 71 of the magnetic tape 2 by means of a further set-screw 91. FIG. 3 shows the third height guide 27 with the further displacement means 87. Two parallel arms 97 and 99 connect the third height guide 27 to a support 101 which is pivotable about the flexible hinge 95. The ends of the arms 97 and 99 are pivotally connected to the support 101 and the third height guide 27. The height of the third height guide relative to the mounting surface 3 can be adjusted by means of the further set-screw 91, so that depending on the displacement in the height direction, the magnetic tape 2 is guided by the first tape-guide surface 79 or the second tape-guide surface 81. By means of the third height guide 27 the magnetic tape 2 can be fine-adjusted accurately in the width direction 71. During this fine adjustment of the magnetic tape 2 in the width direction 71, the magnetic tape is supported over a greater length, thereby limiting the load on the tape edge 61.

Figure 4:
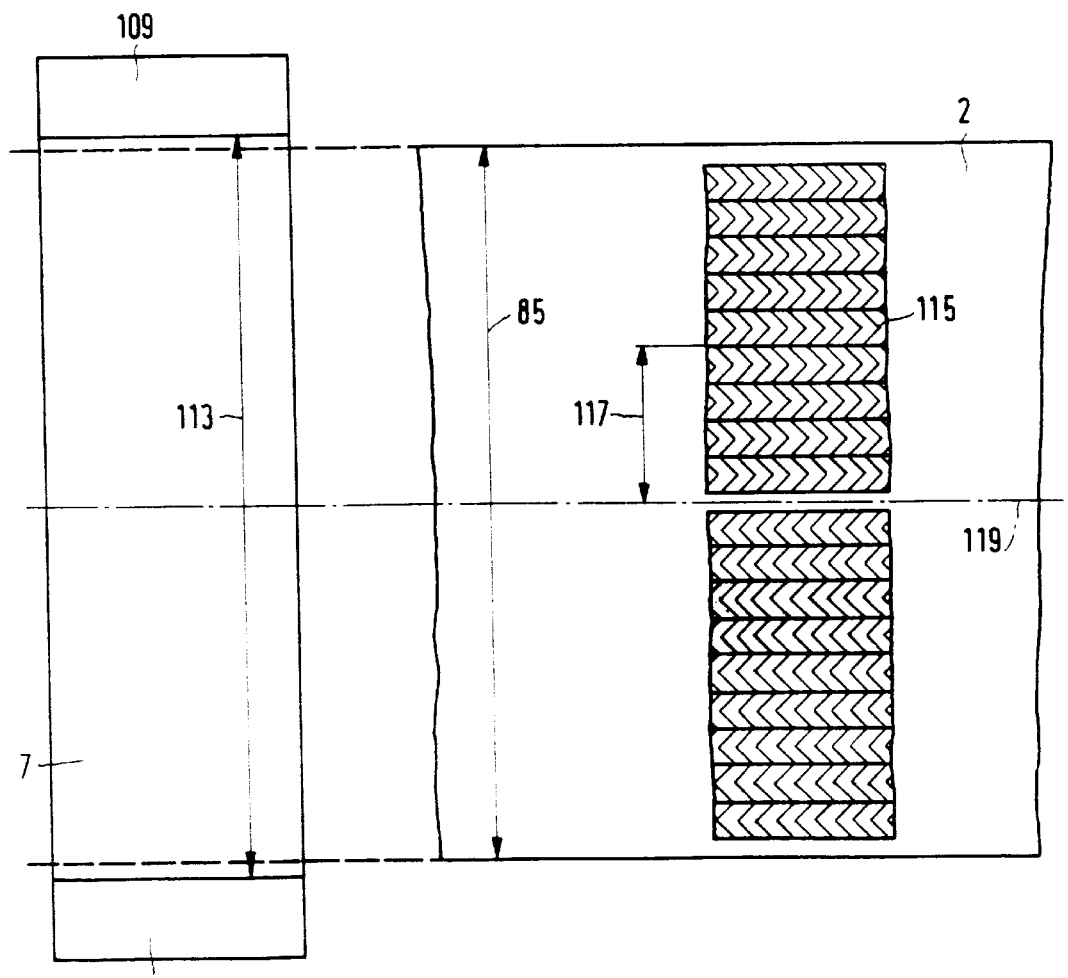
FIG. 4 shows a part of a magnetic tape with information tracks.

The adjustment method is described below. Before a magnetic-tape reel is placed on the reel-drive spindle the reel discs (not shown) on the reel-drive spindles 13, 15 and the magnetic-head unit 5 are adjusted in height relative to the mounting surface 3 by means of an adjustment jig. After a magnetic-tape reel 37 has been placed onto the reel-drive spindle 13 the magnetic tape 2 is led to the take-up reel 39 via the first height guide 25, the first capstan 55, the magnetic-head unit 5, the second capstan 57 and the second height guide 29 and is attached to the take-up reel. For the time being the tape-tension rollers 45, 47 and pressure rollers 103, 105 remain clear of the magnetic tape 2 (shown in broken lines in FIG. 1). Subsequently, the second pressure roller 105 is brought to the operational position (continuous line) and the tape transport is started, so that the second pressure roller 105 presses the magnetic tape 2 against the second capstan 57 and the second capstan and pressure roller combination 19 defines the transport speed 107. The first height guide 25 is now adjusted in a direction parallel to the width direction 71 of the magnetic tape 2. After the adjustment the magnetic tape should occupy such a position relative to the magnetic-head unit that during recording the information is written in tracks at the specified position on the magnetic tape within the specified tolerance. FIG. 4 shows a part of the magnetic tape 2 provided with tracks 115. The tracks should be recorded on the magnetic tape at a specified position. Each track 115 should be situated on the magnetic tape at a specified distance 117 and within a specified tolerance from the centre 119 of the magnetic tape 2. This tolerance is ±35 μm. During adjustment the magnetic tape 2 at the location of the magnetic heads 6, 8 is observed. To aid adjustment of the height guides tape guides 7, 9, 11 are arranged at each side of the magnetic heads 6, 8, which tape guides each comprise two projections 109, 111 (see also FIG. 2). The projections 109, 111 are spaced from each other by a distance 113 larger than the width 85 of the magnetic tape 2. The centres between the projections are disposed in line and in the centres of the magnetic heads. The first height guide 25 is adjusted in such a way that the magnetic tape 2 is centred as accurately as possible between the three pairs of projections 109, 111. Subsequently, the first pressure roller 103 is brought into contact with the magnetic tape and the second pressure roller 105 is disengaged from the second capstan 57. Now the second height guide 29 is adjusted using the same procedure as described above. After this, the second pressure roller 105 is applied to the second capstan 57 and the position of the magnetic tape 2 is checked. The adjustment of the second height guide 29 may have had such an effect that the first height guide 25 requires a slight readjustment. This readjustment can be effected in the same way as the adjustment described above. Subsequently, it may also be necessary to readjust the second height guide 29. If necessary, this readjustment may be repeated a few times. The magnetic tape is in the correct position if the magnetic tape 2 runs between the projection pairs 109, 111 in a centred position. In order to reach this position with even greater accuracy the magnetic tape 2 is adjusted by means of the third height guide 27 after the first pressure roller 103 has been disengaged from the first capstan 55. To enable the correct position to be determined with optimum accuracy, the magnetic tape at the location of the projections 109, 111 is observed by means of the optical device 63. Finally, the tape-tension rollers 45, 47 are brought into the operating position (shown in continuous lines in FIG. 1) and the process of recording on the magnetic tape can be started. This method has to be carried out only once. If a recording is to be made on a further magnetic tape the magnetic-tape reel can be placed simply onto the reel-drive spindle 13, one end of the magnetic tape should be attached to the take-up reel 39, and recording can be started without renewed adjustment of the height guides 25, 27, 29.

Although the invention has been described hereinbefore in terms of certain embodiments with reference to the drawings it is to be noted that the invention is not limited to the embodiments shown in the drawings. The invention also extends to other embodiments which fall within the scope of the invention as defined by the appended Claims.

What is claimed is:

1. Method of manufacturing a magnetic tape prior to manufacture of, in which information is recorded in longitudinal tracks within a specified tolerance at a specified position on a magnetic tape, the magnetic tape being conveyed from a supply reel to a take-up reel via a first height guide, a first capstan and pressure roller combination, a magnetic-head unit for recording information on the magnetic tape, a second capstan and pressure roller combination, and a second height guide, edges of the magnetic tape being clear of parts of a magnetic-tape apparatus in a tape-path section between the capstans, and the height guides being adjusted in a direction parallel to the width direction of the magnetic tape before the information is recorded on the magnetic tape, characterised in that before the information is recorded on the magnetic tape and while the magnetic tape is guided by the height guides first the first height guide is adjusted in a direction parallel to a width direction of the magnetic tape during tape transport, the first pressure roller being kept clear of the first capstan, after which the second height guide is adjusted in a direction parallel to a width direction of the magnetic tape during tape transport, the second pressure roller being kept clear of the second capstan and the positional change of the magnetic tape at the location of the magnetic-head unit being fed back during the adjustment until the magnetic tape has reached such a position relative to the magnetic-head unit that during recording the information is recorded in tracks within the specified tolerance at the specified position on the magnetic tape, after which the information is recorded on the magnetic tape.

2. A method as claimed in claim 1, characterised in that between the first height guide and the first capstan and pressure roller combination the magnetic tape is adjusted in a direction parallel to the width direction of the magnetic tape by a third height guide, the first pressure roller being kept clear of the first capstan and adjustment being effected while the magnetic tape is being guided by the third height guide and after the first height guide has been adjusted.

3. A magnetic-tape apparatus suitable for carrying out the method as claimed in claim 1, the apparatus comprising two reel-drive spindles, two height guides, each height guide consisting of a central cylindrical portion, top and bottom cylindrical portions having a larger diameter than the central portion, and two tapered portions between the central portion and the top and bottom portions, respectively, two capstan and pressure roller combinations and one magnetic-head unit, characterised in that the height guides comprise displacement means by which the height guides are adjustable in a direction parallel to the width direction of the magnetic tape during transport of the magnetic tape.

4. A magnetic-tape apparatus as claimed in claim 3, characterised in that a third height guide is arranged between the first height guide and the first capstan and pressure roller combination, which third height guide comprises further displacement means by which the third height guide is adjustable in a direction parallel to the width direction of the magnetic tape during transport of the magnetic tape.

5. A magnetic-tape apparatus as claimed in claim 3, characterised in that the magnetic-tape apparatus comprises an optical device by means of which the position of the magnetic tape at the location of the magnetic-head unit can be monitored.

6. A magnetic-tape apparatus suitable for carrying out the method as claimed in claim 2, the apparatus comprising two reel-drive spindles, two height guides, each height guide comprising a central cylindrical portion, top and bottom cylindrical portions having a larger diameter than the central portion, and two tapered portions between the central portion and the top and bottom portions, respectively, two capstan and pressure roller combinations and one magnetic-head unit, characterized in that the height guides comprise displacement means by which the height guides are adjustable in a direction parallel to the width direction of the magnetic tape during transport of the magnetic tape.

7. A magnetic-tape apparatus as claimed in claim 4, characterized in that the magnetic-tape apparatus comprises an optical device by means of which the position of the magnetic tape at the location of the magnetic-head unit can be monitored.

* * * * *